(12) United States Patent
Persson et al.

(10) Patent No.: US 9,986,453 B2
(45) Date of Patent: May 29, 2018

(54) MEASUREMENT CONFIGURATION OF WIRELESS COMMUNICATION DEVICES

(71) Applicant: TELEFONAKTIEBOLAGET L M ERICSSON (PUBL), Stockholm (SE)

(72) Inventors: Magnus Persson, Sollentuna (SE); Ying Sun, Sundbyberg (SE); Björn Nordström, Solna (SE); Per Thoresen, Stockholm (SE); Amir Saadati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 197 days.

(21) Appl. No.: 14/782,079

(22) PCT Filed: Oct. 1, 2015

(86) PCT No.: PCT/EP2015/072679
§ 371 (c)(1),
(2) Date: Oct. 2, 2015

(87) PCT Pub. No.: WO2017/054873
PCT Pub. Date: Apr. 6, 2017

(65) Prior Publication Data
US 2017/0251388 A1    Aug. 31, 2017

(51) Int. Cl.
*H04W 24/08* (2009.01)
*H04W 24/10* (2009.01)
*H04W 28/02* (2009.01)
*H04B 17/318* (2015.01)
*H04W 24/02* (2009.01)

(52) U.S. Cl.
CPC .......... *H04W 24/08* (2013.01); *H04B 17/318* (2015.01); *H04W 24/10* (2013.01); *H04W 28/0268* (2013.01); *H04W 28/0278* (2013.01); *H04W 24/02* (2013.01)

(58) Field of Classification Search
CPC . H04W 24/08; H04W 24/10; H04W 28/0268; H04W 28/0278
See application file for complete search history.

(56) References Cited

U.S. PATENT DOCUMENTS

2014/0200001 A1    7/2014 Song et al.

OTHER PUBLICATIONS

Alcatel-Lucent, et al., Interference Measurement for CoMP, 3GPP TSG RAN WG1 meeting #69, R1-122482, Prague, Czech, May 21-25, 2012.

(Continued)

*Primary Examiner* — Ronald B Abelson

(57) ABSTRACT

A method for selecting wireless communication devices for measurement configuration in a wireless communication network comprises a step of obtaining at least one report on signal strength and/or signal quality from a wireless communication device in the wireless communication network. The method further comprises a step of determining whether or not to select the wireless communication device for measurement configuration, where the measurement configuration comprises configuring the wireless communication device to provide measurement reports on received power from serving cells and neighbour cells in the wireless communication network, and where the step of determining is based on the at least one obtained report on signal strength and/or signal quality.

16 Claims, 12 Drawing Sheets

(56) References Cited

OTHER PUBLICATIONS

Ericsson et al., Carrier Aggregation and the s-Measure criterion, 3GPP TSG RAN WG2 meeting #69bis, Tdoc R2-101998, Beijing, China, Apr. 12-16, 2010.
Ericsson et al., Generalization of events A3, A5, and B2, 3GPP TSG RAN WG2 #69bis, Tdoc R2-101997, Beijing, China, Apr. 12-16, 2010.
3GPP TS 36.331 V8.21.0, 3rd Generation Partnership Project; Technical Specification Group Radio Access Network; Evolved Universal Terrestrial Radio Access (E-UTRA); Radio Resource Control (RRC); Protocol specification (Release 8), Jun. 2014, pp. 1-16 and 57-73.

Coordinated Link Adaptation

Dynamic Point Blanking

Coordinated Beamforming

Joint Transmission

MEASUREMENT CONFIGURATION OF WIRELESS COMMUNICATION DEVICES

This application is a 371 of International Application No. PCT/EP2015/072679, filed Oct. 1, 2015, the disclosure of which is fully incorporated herein by reference.

TECHNICAL FIELD

The proposed technology generally relates to coordination in a heterogeneous wireless communication network and more specifically to measurement configuration of wireless communication devices in such a network.

BACKGROUND

Heterogeneous network (HetNet) deployment is one important part of future radio networks in order to serve the increasing capacity and quality demands. A HetNet deployment consists of small cells overlaid in an existing macro network.

The small cells typically have lower output power compared to the macro cells and due to this the coverage of these cells are also smaller compared to the macro cells. A typical deployment for the small cells is therefore localized hotspots, such as a train station, where the traffic load is high in the small cells but the area is often covered by the surrounding Macro cell(s) also.

Overlapping coverage also means that the Macro cell will cause interference to the small cells if operating on the same carrier frequency. FIG. 1 shows an example of a HetNet scenario in a wireless communication network 1, where a wireless communication device 20 or user equipment (UE) near the cell border of its serving base station 10 experiences strong inter-cell interference from a Macro base station in a neighbour cell. Typically it is not optimal to switch off these interfering Macro cells since they are needed for maintaining full coverage and/or for covering traffic in e.g. high rise buildings surrounding the hotspot. By applying offsets (in power) at cell (re-)selection and handover, the coverage of the small cell can be made larger but with the drawback of increased downlink interference from the Macro cell. This is known as Cell Range Expansion (CRE).

To counteract severe interference scenarios it is possible to utilize coordination features, one of which is often referred to as Downlink Coordinated Multi-Point (DL CoMP), which perform fast (per scheduling interval, typically 1 ms) coordination between interfering cells, i.e. the transmission from one or more antennas are coordinated knowing the interference situation in the neighbour cells and its impact on a specific UE. See FIG. 2 for examples of coordination schemes. These schemes all have in common that they try to avoid (or at least predict) collisions when transmitting to several users in a cluster of several cells. Coordinated Link Adaptation tries to predict potential interfering sources and thereby improving the link adaptation accuracy, Dynamic Point Blanking prevents transmission in neighbour time/frequency grid to avoid inter-cell interference, Coordinated Beamforming tries to point a null (a beam with very low power) to primary victim while maintaining high throughput to selected user(s), and Joint Transmission tries to maximize the throughput to one or several users (UEs) while transmitting from several cells/antenna beams in parallel.

However, all the CoMP schemes described above require that the UEs perform measurements in order to select best beam/cell/transport format (user bitrate), and this results in increased processing need in the UE and network, and high signalling load over the radio interface. To reduce the effect of these drawbacks, it would be desirable to know when it is actually beneficial to use CoMP.

SUMMARY

It is an object to provide methods, wireless nodes and computer programs for measurement configuration of wireless communication devices in a (heterogeneous) wireless communication network.

This and other objects are met by embodiments of the proposed technology.

An aspect of the embodiments relates to a method for selecting wireless communication devices for measurement configuration in a wireless communication network. The method comprises a step of obtaining at least one report on signal strength and/or signal quality from a wireless communication device in the wireless communication network. The method further comprises a step of determining whether or not to select the wireless communication device for measurement configuration, where the measurement configuration comprises configuring the wireless communication device to provide measurement reports on received power from serving cells and neighbour cells in the wireless communication network, and where the step of determining is based on the at least one obtained report on signal strength and/or signal quality.

Another aspect of the embodiments relates to an arrangement configured to select wireless communication devices for measurement configuration in a wireless communication network. The arrangement is configured to obtain at least one report on signal strength and/or signal quality from a wireless communication device in the wireless communication network. The arrangement is further configured to determine whether or not to select the wireless communication device for measurement configuration, based on the at least one obtained report on signal strength and/or signal quality, where the measurement configuration comprises configuring the wireless communication device to provide measurement reports on received power from serving cells and neighbour cells in the wireless communication network.

Yet another aspect of the embodiments relates to a computer program comprising instructions, which when executed by at least one processor, cause the at least one processor to obtain at least one report on signal strength and/or signal quality from a wireless communication device in the wireless communication network, and to determine whether or not to select the wireless communication device for measurement configuration, based on the at least one obtained report on signal strength and/or signal quality, where the measurement configuration comprises configuring the wireless communication device to provide measurement reports on received power from serving cells and neighbour cells in the wireless communication network.

Some advantages of the proposed technology are:
Reduced measurement processing need in the UE and network.
Reduced radio interface (Uu) load.
More robust mobility handling.
Reduced battery consumption in the UE.
Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief system overview and/or analysis of the technical problem.

As described above, coordination features, often referred to as Downlink CoMP, may be used in order to counteract severe interference scenarios. However, all the CoMP schemes described above require that the UEs perform measurements in order to select best beam/cell/transport format (user bitrate). The standard 3GPP Release 11 introduces TM10 (CSI-RS/IM) which enables tools for fast coordination, but coordination can also be based on 3GPP Release 8 RSRP measurements.

However, measuring the relation between serving cell received power vs. interference cell power (often referred as to the downlink "geometry") by means of Release 8 RSRP/RSRQ measurements for all UEs in a cell is not feasible since it will cause too high signalling load over the radio interface. Also, some UEs within a HetNet are unlikely to gain from using CoMP, i.e. users that are not limited by neighbour cell interference. Therefore, there is a need for an efficient procedure for selecting the UEs/wireless communication devices that will benefit from coordination.

Figure 1:
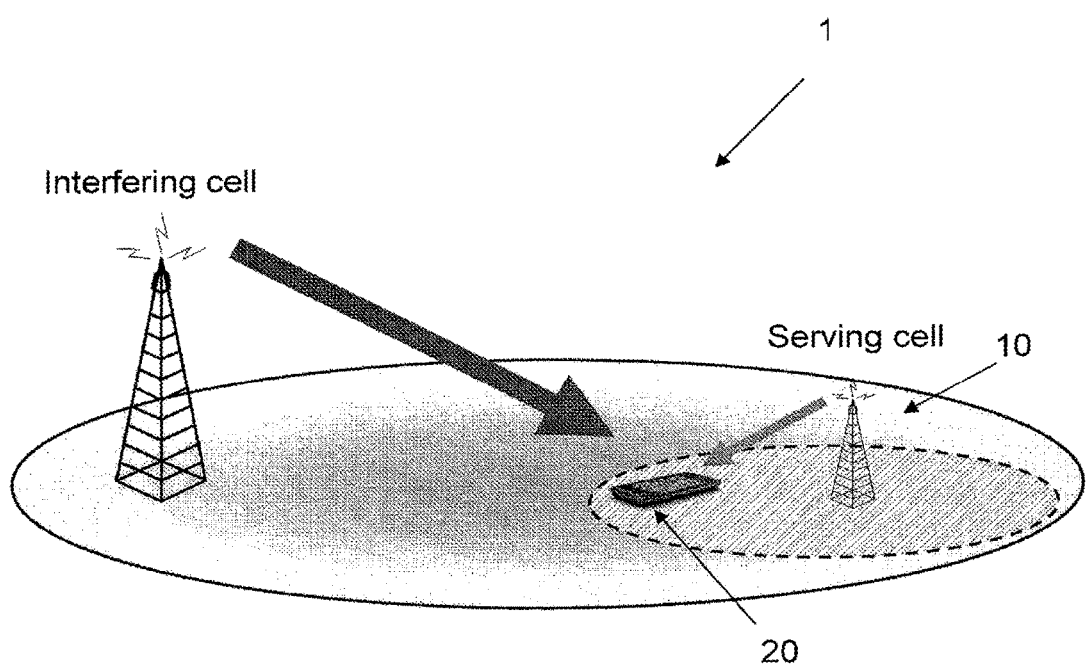
FIG. 1 is a schematic diagram illustrating an example of a HetNet scenario in a wireless communication network.
Figure 2:
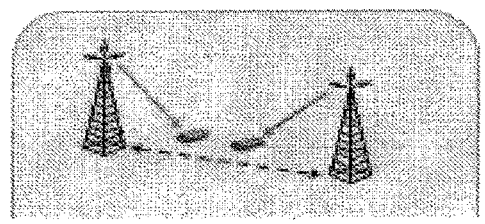
FIG. 2 is a schematic diagram illustrating some examples of downlink CoMP schemes.
Figure 2:
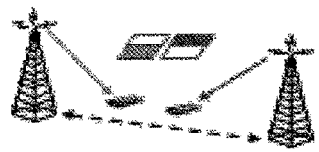
Figure 2:
Figure 2:
Figure 3:
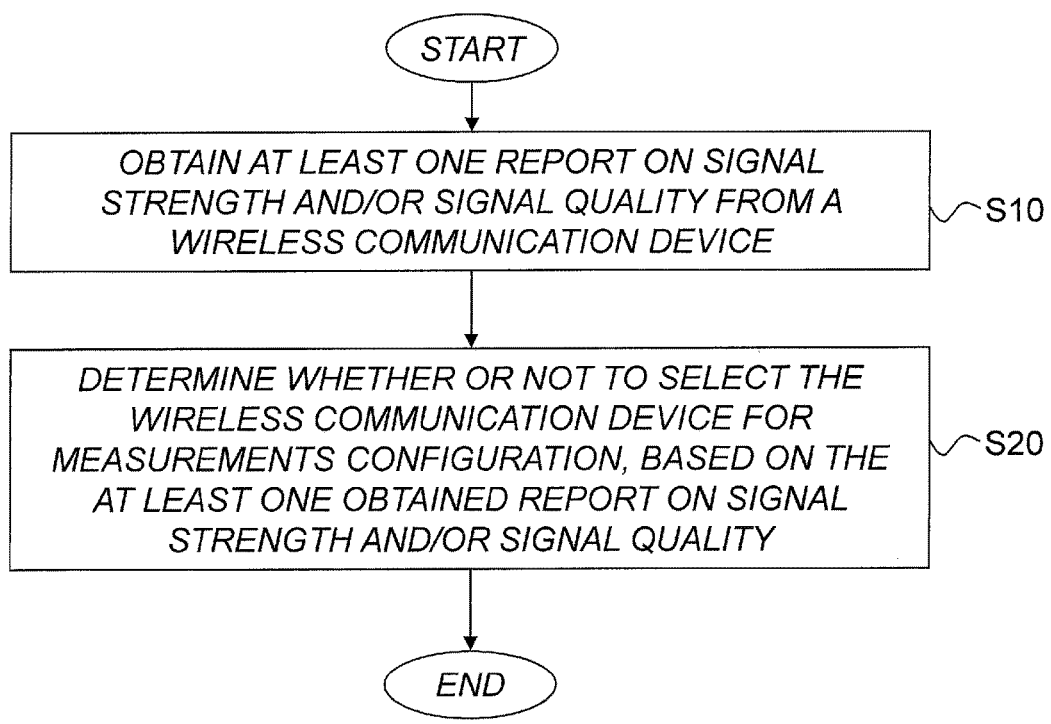
FIG. 3 is a schematic flow diagram illustrating an example of a method for selecting wireless communication devices for measurement configuration in a wireless communication network according to an embodiment.

FIG. 3 is a schematic flow diagram illustrating an example of a method for selecting wireless communication devices for measurement configuration in a wireless communication network. The method comprises a step S10 of obtaining at least one report on signal strength and/or signal quality from a wireless communication device in the wireless communication network. The method further comprises a step S20 of determining whether or not to select the wireless communication device for measurement configuration, where the measurement configuration comprises configuring the wireless communication device to provide measurement reports on received power from serving cells and neighbour cells in the wireless communication network, and where the step S20 of determining is based on the at least one obtained report on signal strength and/or signal quality.

In general terms, the wireless communication devices in the wireless communication network sends reports on signal strength and/or signal quality, indicating the downlink signal-to-interference-plus-noise ratio (SINR) situation for the respective wireless communication device, and these reports are used to select which wireless communication devices that shall measure and report received power from serving cells and neighbour cells. From these measurements of received power it can then be deducted which wireless communication devices that have the largest potential to benefit from coordination.

As an example, information on signal strength and/or signal quality can be obtained from Channel State Information (CSI) reports, either periodic or aperiodic. Thus, in a particular embodiment of the method shown in FIG. 3 the at least one report on signal strength and/or signal quality comprises at least one CSI report. In particular, the signal quality can be obtained from a Channel Quality Indicator (CQI) comprised in the CSI reports. Thus, in a particular embodiment of the method shown in FIG. 3 the step S20 of determining is based on at least one CQI value for the wireless communication device, where the at least one CQI value is obtained from the at least one CSI report.

Furthermore, in some embodiments the step S20 of determining may also be based on characteristics of active radio bearers for the wireless communication device. For example, in different particular embodiments the characteristics of active radio bearers may comprise e.g. a Quality of Service Class Identifier (QCI), buffer status, and/or previous traffic activity of the wireless communication device. In some embodiments the step S20 of determining may further be based on an inactivity timer for the wireless communication device. This is to avoid configuring wireless communication devices to perform power measurements if they have e.g. very small data buffer or are close to switching state to idle mode.

To avoid the impact of erroneous or fast fluctuating CQI values, a number of consecutive CQI values may be filtered over time (for equalization/smoothing) to achieve a reliable CQI value. Thus, in an embodiment the method shown in FIG. 3 may further comprise filtering a plurality of consecutive CQI values for the wireless communication device over time to provide a filtered CQI value for the wireless communication device, and then the step S20 of determining is based on that filtered CQI value.

As an example, a criteria for selecting a wireless communication device for measurement configuration could be that the filtered CQI value should be within a certain upper and lower threshold. Thus, in an embodiment the step S20 of determining comprises selecting the wireless communication device for measurement configuration if at least one filtered CQI value for the wireless communication device is between a pre-defined lower and upper threshold value. In a particular case the criteria for selecting a wireless communication device for measurement configuration could be that all filtered CQI values during a certain time should be within the upper and lower threshold. Thus, in a particular embodiment the step S20 of determining comprises selecting the wireless communication device for measurement configuration if all filtered CQI values for the wireless communication device during a pre-defined time are between the pre-defined lower and upper threshold value. See FIG. 5 for a schematic diagram illustrating an example of an algorithm for selecting wireless communication devices for measurement configuration based on filtered CQI values according to an embodiment. In this example, a "timer" starts when the filtered CQI value is within the upper and lower threshold, and then the filtered CQI value needs to be within these thresholds for a certain time before the wireless communication device can be selected for measurement configuration.

In some embodiments the wireless communication device is a user equipment (UE). In such embodiments the measurement configuration comprises configuration of Long Term Evolution (LTE) UE Measurement Events according to 3GPP Release 8. In a particular embodiment the LTE UE Measurement Events comprise Event A3 and/or Event A5.

In short, the user equipment uses either Reference Signal Received Power (RSRP) or Reference Signal Received Quality (RSRQ) measurements to determine whether to enter the Measurement Event condition. Once the event is triggered, the user equipment will wait a predetermined time before it commences sending measurement reports to the serving radio base station (RBS). Measurement reports are sent periodically whilst the event condition is active. The LTE Event A3 is triggered when a neighbour cell becomes better than the serving cell by an offset. The LTE Event A5 is triggered when the serving cell becomes worse than a threshold-1 while a neighbouring cell becomes better than a threshold-2 (see Ref. 1 for more information).

In the following, some non-limiting examples of illustrative embodiments are described.

In a typical embodiment the periodic/aperiodic CSI/CQI reports are used to select the wireless communication devices that have largest potential to gain from DL CoMP. In some embodiments e.g. the buffer status and/or UE inactivity timer of the wireless communication devices may also be used to avoid setting up UE measurement events for users that have very small data buffer or are close to switching state to idle mode. Potentially, the traffic characteristics of Quality of Service Class Identifier (QCI) can also be used to determine the potential benefit from DL CoMP in some embodiments. A wireless communication device with service characterized by small packet size but frequent transmissions, for example Voice over IP (VoIP), may also benefit from DL CoMP.

Figure 4:
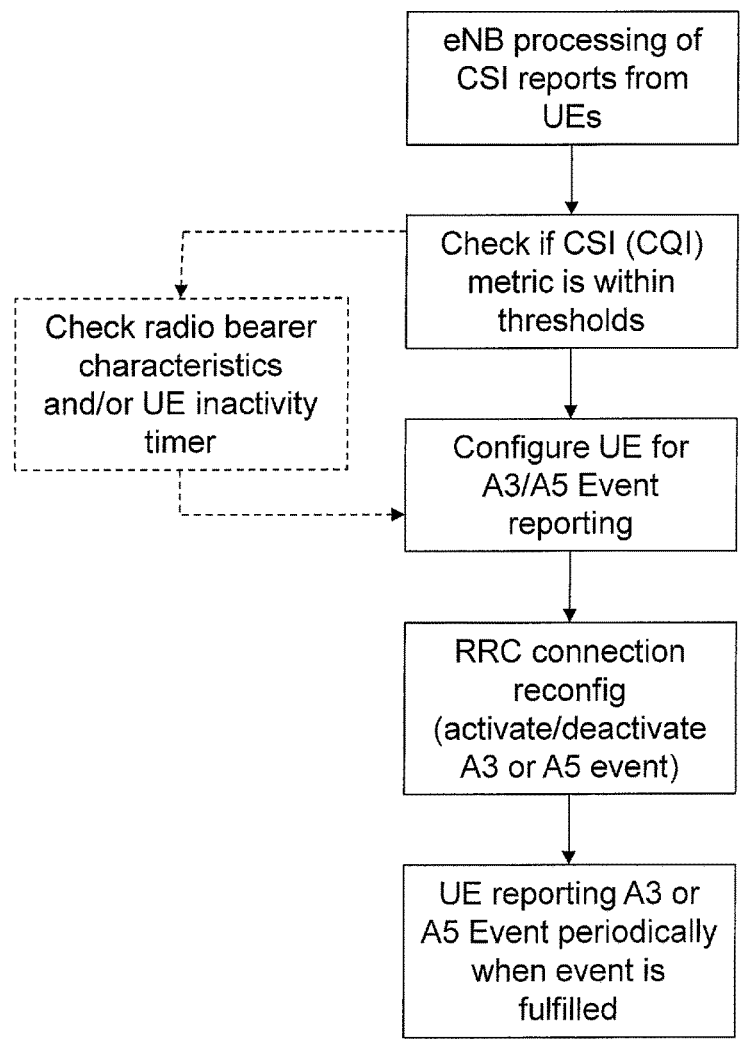
FIG. 4 is a schematic flow diagram illustrating an example of a method for selecting wireless communication devices for configuration of A3 and A5 Event reporting in an LTE network according to a particular embodiment.

FIG. 4 is a schematic flow diagram illustrating an example of a method for selecting wireless communication devices for configuration of A3 and A5 Event reporting in an LTE network according to a particular embodiment. According to an embodiment, the eNB (base band) receives the periodic and aperiodic CSI/CQI reports of all connected UEs, indicating the UE downlink signal-to-interference-plus-noise ratio (SINR) situation, which is used to select which users that shall measure and report the received power strength from neighbour cells (by means of A3/A5 Event).

Figure 5:
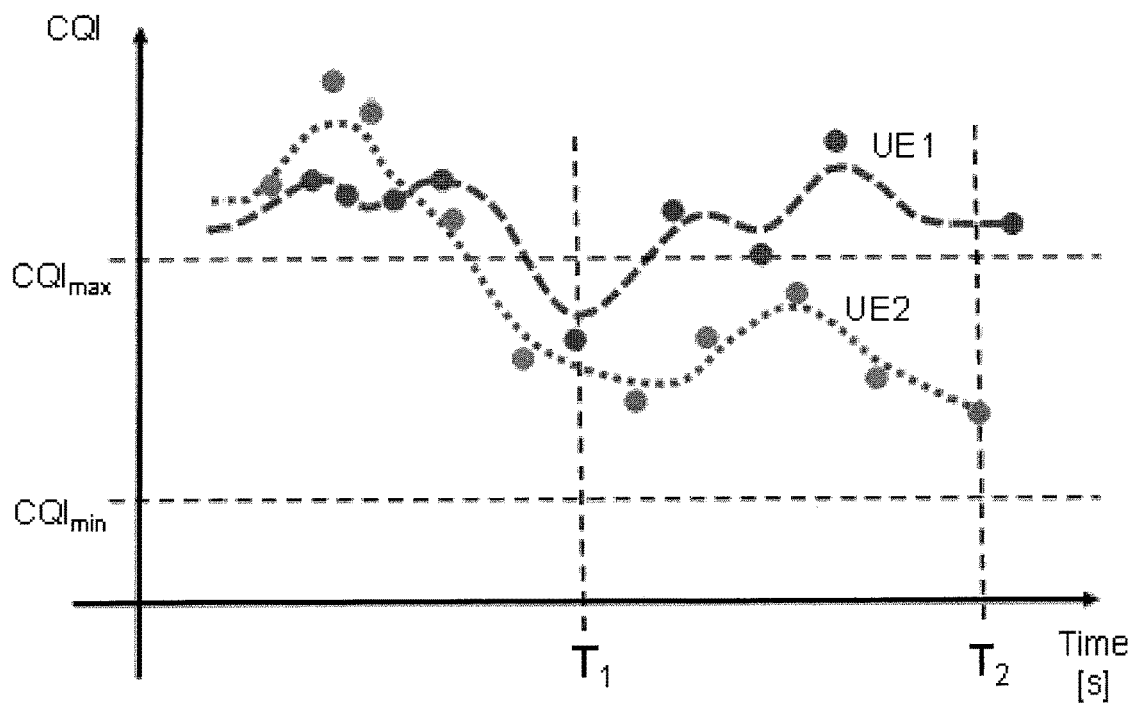
FIG. 5 is a schematic diagram illustrating an example of an algorithm for selecting wireless communication devices for measurement configuration based on CQI according to an embodiment.

In an example embodiment a number of consecutive CQI values from a UE are filtered over time (for equalization/smoothing), and then it is checked that the filtered value is within an upper and lower threshold (see FIG. 5). Additional metrics, such as characteristics of the UE's radio bearers (e.g. Quality of Service Class Identifier (QCI), buffer status and/or previous traffic activity), or UE inactivity timer, can be used in order not waste signalling processing and Uu radio interface resources for UEs that have little or no traffic activity, or most likely will go to idle state shortly.

The same metrics can also be used to deactivate UE measurement events for UEs that are unlikely to gain using CoMP (i.e. users that are not limited by neighbour cell interference) since e.g. their radio environment has changed, or the buffer status has changed, or the UE is going idle or will likely go to idle state.

FIG. 5 is a schematic diagram illustrating an example of an algorithm for triggering a wireless communication device to setup measurement event reporting based on filtered CQI values according to an embodiment. The "UE selection" algorithm defines that UEs having suitable channel quality between a maximum CQI and a minimum CQI for a certain period of time could be selected for UE measurement event configuration, and thus as candidates to perform DL CoMP. Criteria may also be added that all (filtered) CQI samples during a pre-defined time need fulfil the CQI criteria. Such an algorithm can also be extended to e.g. triggering configuration of measurements for UE2 at time T2 but preventing the configuration for UE1 at time T1 (see FIG. 5), assuming that a TriggerProhibitTime is used, that defines the time (in milliseconds) that a UE should be within the max and min CQI before it may be triggered to setup a UE A5 or A3 Event.

Thus, one idea of the present disclosure is to use CSI/CQI reports to select users for UE measurement event configuration (add or remove UE event) by means of validating the filtered CQI value both in strength and in time. In some embodiments characteristics of active radio bearers (QCI, data buffer estimates, previous traffic activity) are also used to select users for UE measurements event configuration (add or remove UE event). In other embodiments, the UE inactivity timer is also used to select users for UE measurements event configuration (add or remove UE event).

Some advantages of the proposed technology are:
Reduced measurement processing need in the UE and network (since not all UE need to report). The alternative to configure all UEs already at call setup with UE measurement events is in most cases not feasible since this may cause very high signalling/processing load and there are no 3GPP mechanisms to select good candidate reports without processing them.
Reduced radio interface (Uu) load since there is less Radio Resource Control (RRC) signalling (fewer UE measurement reports in uplink).
More robust mobility handling since there is less signalling from UEs in bad coverage (setting up UE events for these users is avoided).
Reduced battery consumption in the UE (due to reduced processing).

As used herein, the non-limiting terms "wireless communication device" and "User Equipment (UE)" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "wireless network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "network device" may refer to any device located in connection with a communication network, including but not limited to devices in access networks, core networks and similar network structures. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to select wireless communication devices for measurement configuration in a wireless communication network. The arrangement is configured to obtain at least one report on signal strength and/or signal quality from a wireless communication device in the wireless communication network. The arrangement is further configured to determine whether or not to select the wireless communication device for measurement configuration, based on the at least one obtained report on signal strength and/or signal quality, where the measurement configuration comprises configuring the wireless communication device to provide measurement reports on received power from serving cells and neighbour cells in the wireless communication network.

In some embodiments the arrangement is further configured to determine whether or not to select the wireless communication device for measurement configuration based on characteristics of active radio bearers for the wireless communication device. For example, in different particular embodiments the characteristics of active radio bearers may comprise e.g. a Quality of Service Class Identifier (QCI), buffer status, and/or previous traffic activity of the wireless communication device. In some embodiments the arrangement is further configured to determine whether or not to select the wireless communication device for measurement configuration based on an inactivity timer for the wireless communication device.

As an example, information on signal strength and/or signal quality can be obtained from Channel State Information (CSI) reports, either periodic or aperiodic. Thus, in a particular embodiment of the arrangement the at least one report on signal strength and/or signal quality comprises at least one CSI report. In particular, the signal quality can be obtained from a Channel Quality Indicator (CQI) comprised in the CSI reports. Thus, in a particular embodiment the arrangement is configured to determine whether or not to select the wireless communication device for measurement configuration based on at least one CQI value for the wireless communication device (20), where the at least one CQI value is obtained from the at least one CSI report.

In an embodiment the arrangement is further configured to filter (for equalization/smoothing) a plurality of consecutive CQI values for the wireless communication device over time to provide a filtered CQI value for the wireless communication device. In this embodiment the arrangement is also configured to determine whether or not to select the wireless communication device for measurement configuration based on the filtered CQI value.

As an example, a criteria for selecting a wireless communication device for measurement configuration could be that the filtered CQI value should be within a certain upper and lower threshold. Thus, in an embodiment the arrangement is configured to select the wireless communication device for measurement configuration if at least one filtered CQI value for the wireless communication device is between a pre-defined lower and upper threshold value. In a particular case the criteria for selecting a wireless communication device for measurement configuration could be that all filtered CQI values during a certain time should be within the upper and lower threshold. Thus, in a particular embodiment the arrangement is configured to select the wireless communication device for measurement configuration if all filtered CQI values for the wireless communication device during a pre-defined time are between the pre-defined lower and upper threshold value.

In some embodiments the measurement configuration comprises configuration of Long Term Evolution (LTE) UE Measurement Events according to 3GPP Release 8. In a particular embodiment the LTE UE Measurement Events comprise Event A3 and/or Event A5.

Figure 6:
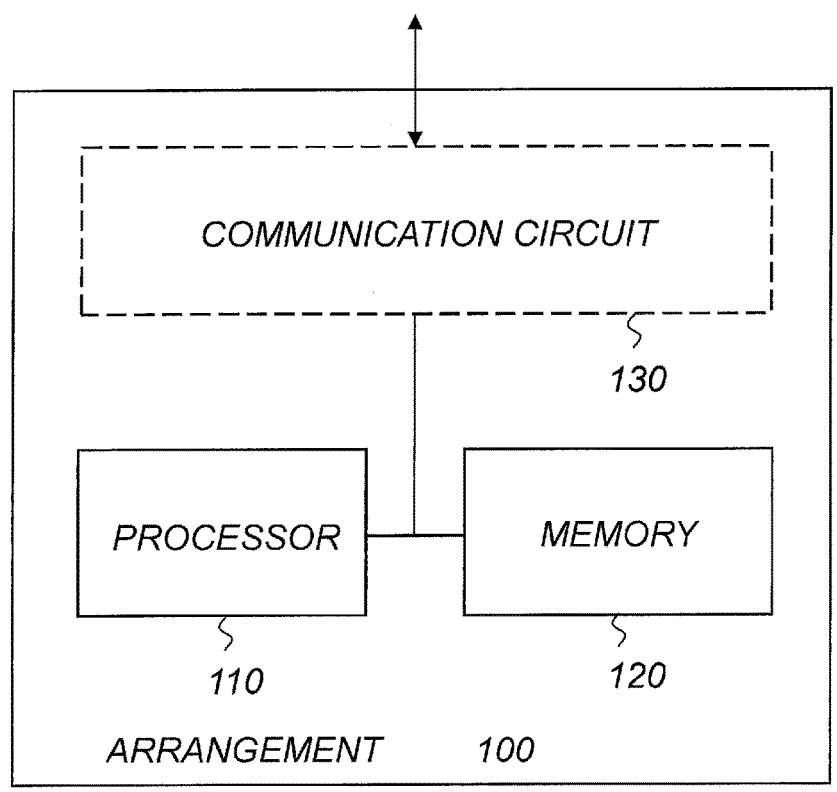
FIG. 6 is a schematic diagram illustrating an example of an arrangement configured to select wireless communication devices for measurement configuration in a wireless communication network according to an embodiment.

FIG. 6 is a schematic block diagram illustrating an example of an arrangement 100, based on a processor-memory implementation according to an embodiment. In this particular example, the arrangement 100 comprises a processor 110 and a memory 120, the memory 120 comprising instructions executable by the processor 110, whereby the processor 110 is operative to obtain at least one report on signal strength or signal quality from a wireless communication device in a wireless communication network, and to determine whether or not to select the wireless communication device for measurement configuration, based on the at least one obtained report on signal strength or signal quality, where the measurement configuration comprises configuring the wireless communication device to provide measurement reports on received power from serving cells and neighbour cells in the wireless communication network.

In a particular embodiment of the arrangement 100 illustrated in FIG. 6 the processor 110 is further operative to determine whether or not to select the wireless communication device for measurement configuration based on characteristics of active radio bearers for the wireless communication device.

In another particular embodiment of the arrangement 100 illustrated in FIG. 6 the processor 110 is further operative to determine whether or not to select the wireless communication device for measurement configuration based on an inactivity timer for the wireless communication device.

In yet another particular embodiment of the arrangement illustrated in FIG. 6 the processor 110 is operative to determine whether or not to select the wireless communication device for measurement configuration based on at least one Channel Quality Indicator, CQI, value for the wireless communication device, where the at least one CQI value is obtained from at least one CSI report, where the at least one report on signal strength and/or signal quality comprises the at least one CSI report.

In yet another particular embodiment of the arrangement illustrated in FIG. 6 the processor 110 is further operative to filter a plurality of consecutive CQI values for the wireless communication device over time to provide a filtered CQI value for the wireless communication device, and the processor is operative to determine whether or not to select the wireless communication device for measurement configuration based on the filtered CQI value.

In yet another particular embodiment of the arrangement illustrated in FIG. 6 the processor 110 is operative to select the wireless communication device for measurement configuration if at least one filtered CQI value for the wireless communication device is between a pre-defined lower and upper threshold value.

In yet another particular embodiment of the arrangement illustrated in FIG. 6 the processor 110 is operative to select the wireless communication device for measurement configuration if all filtered CQI values for the wireless communication device during a pre-defined time are between the pre-defined lower and upper threshold value.

As indicated in FIG. 6 the arrangement 100 may optionally include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). Thus, in an embodiment the arrangement 100 comprises a communication circuit 130 configured to receive at least one report on signal strength and/or signal quality from a wireless communication device in the wireless communication network.

Figure 7:
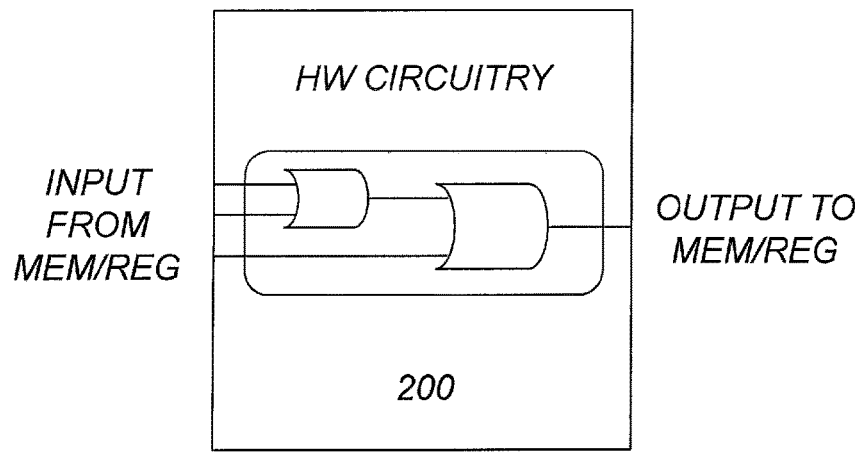
FIG. 7 is a schematic block diagram illustrating an example of an implementation of an arrangement configured to select wireless communication devices for measurement configuration in a wireless communication network according to an embodiment.

FIG. 7 is a schematic block diagram illustrating another example of an arrangement 200, based on a hardware circuitry implementation according to an embodiment. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 8:
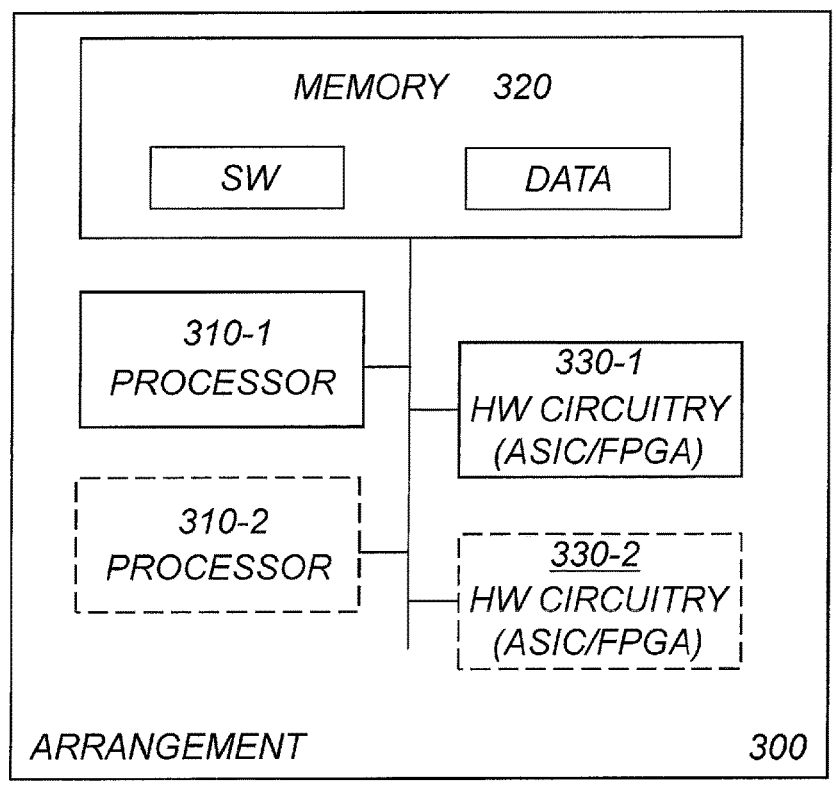
FIG. 8 is a schematic block diagram illustrating another example of an implementation of an arrangement configured to select wireless communication devices for measurement configuration in a wireless communication network according to an embodiment.

FIG. 8 is a schematic block diagram illustrating yet another example of an arrangement 300, based on combination of both processor(s) 310-1, 310-2 and hardware circuitry 330-1, 330-2 in connection with suitable memory unit(s) 320. The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software, SW, for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 9:
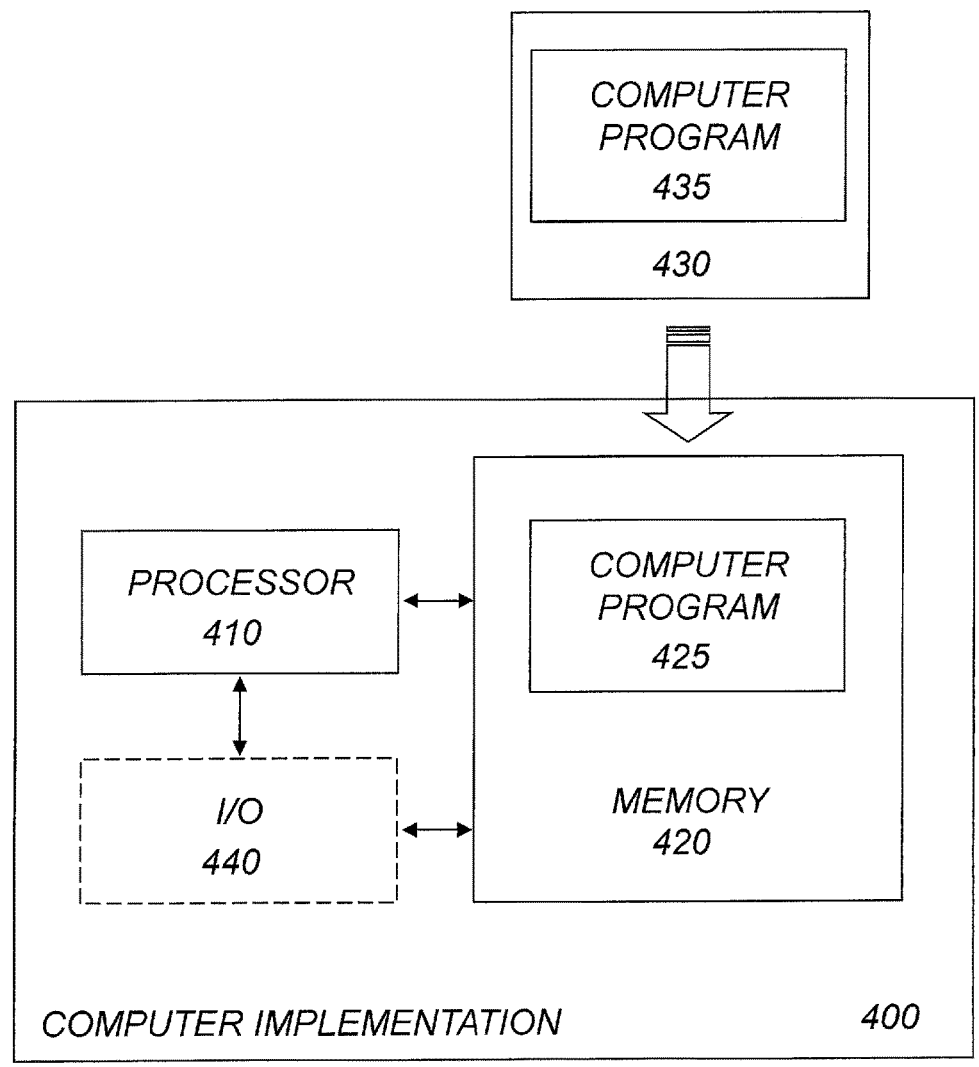
FIG. 9 is a schematic diagram illustrating an example of a computer-implementation according to an embodiment.

FIG. 9 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to obtain at least one report on signal strength and/or signal quality from a wireless communication device in a wireless communication network, and to determine whether or not to select the wireless communication device for measurement configuration, based on the at least one obtained report on signal strength and/or signal quality, where the measurement configuration comprises configuring the wireless communication device to provide measurement reports on received power from serving cells and neighbour cells in the wireless communication network.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 10:
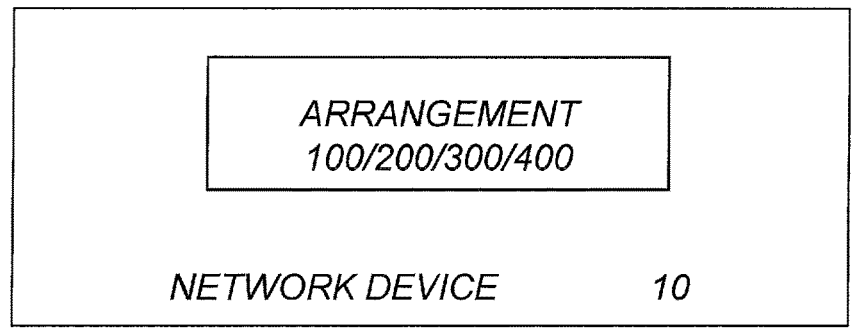
FIG. 10 is a schematic block diagram illustrating an example of a network device comprising an arrangement according to any of the embodiments.

FIG. 10 is a schematic block diagram illustrating an example of a network device 10 comprising an arrangement 100; 200; 300; 400 according to any of the embodiments.

The network device 10 may be any suitable network device in the wireless communication system, or a network device in connection with the wireless communication system. In an example embodiment, the network device is a suitable wireless network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 11:
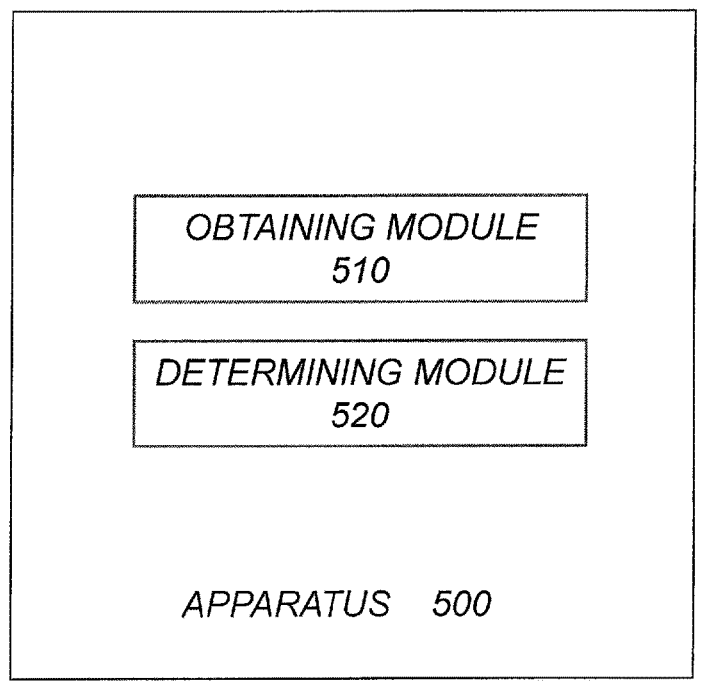
FIG. 11 is a schematic diagram illustrating an example of an apparatus for selecting wireless communication devices for measurement configuration in a wireless communication network according to an embodiment.

FIG. 11 is a schematic diagram illustrating an example of an apparatus 500 for selecting wireless communication devices for measurement configuration in a wireless communication network. The apparatus 500 comprises an obtaining module 510 for obtaining at least one report on signal strength and/or signal quality from a wireless communication device in the wireless communication network. The apparatus 500 further comprises a determining module 520 for determining whether or not to select the wireless communication device for measurement configuration, based on the at least one obtained report on signal strength and/or signal quality, where the measurement configuration comprises configuring the wireless communication device to provide measurement reports on received power from serving cells and neighbour cells in the wireless communication network.

Alternatively it is possible to realize the module(s) in FIG. 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centers, in other scenarios it may in fact be beneficial to distribute functionality over different parts of the network.

Figure 12:
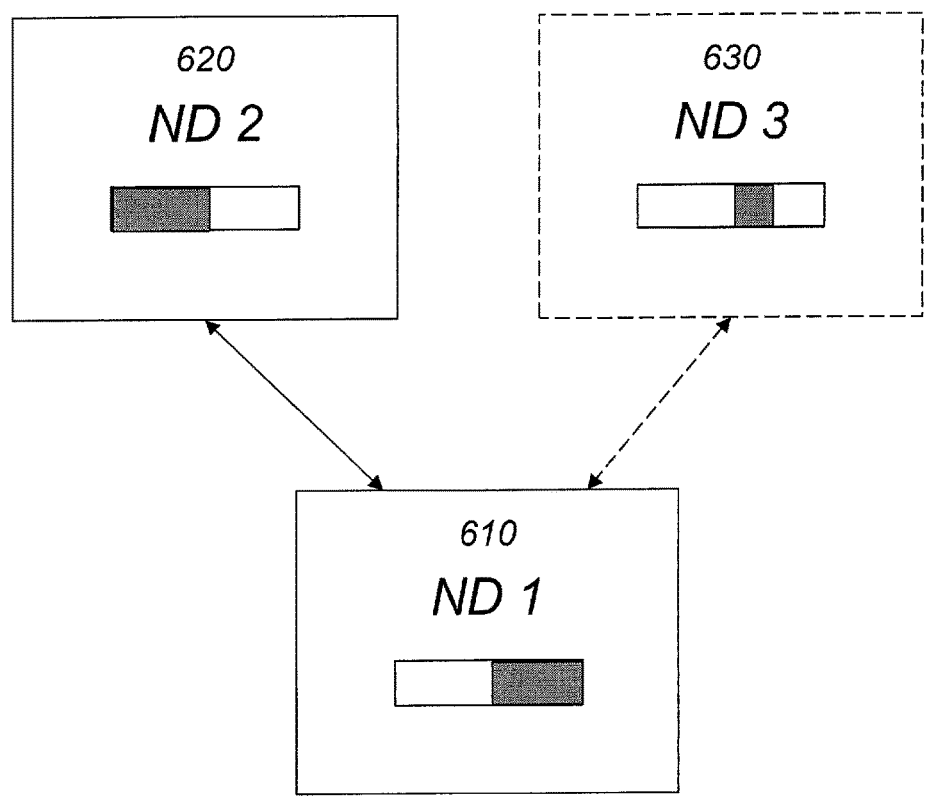
FIG. 12 is a schematic diagram illustrating an example of how functionality can be distributed or partitioned between different network devices in a general case.

FIG. 12 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 13:
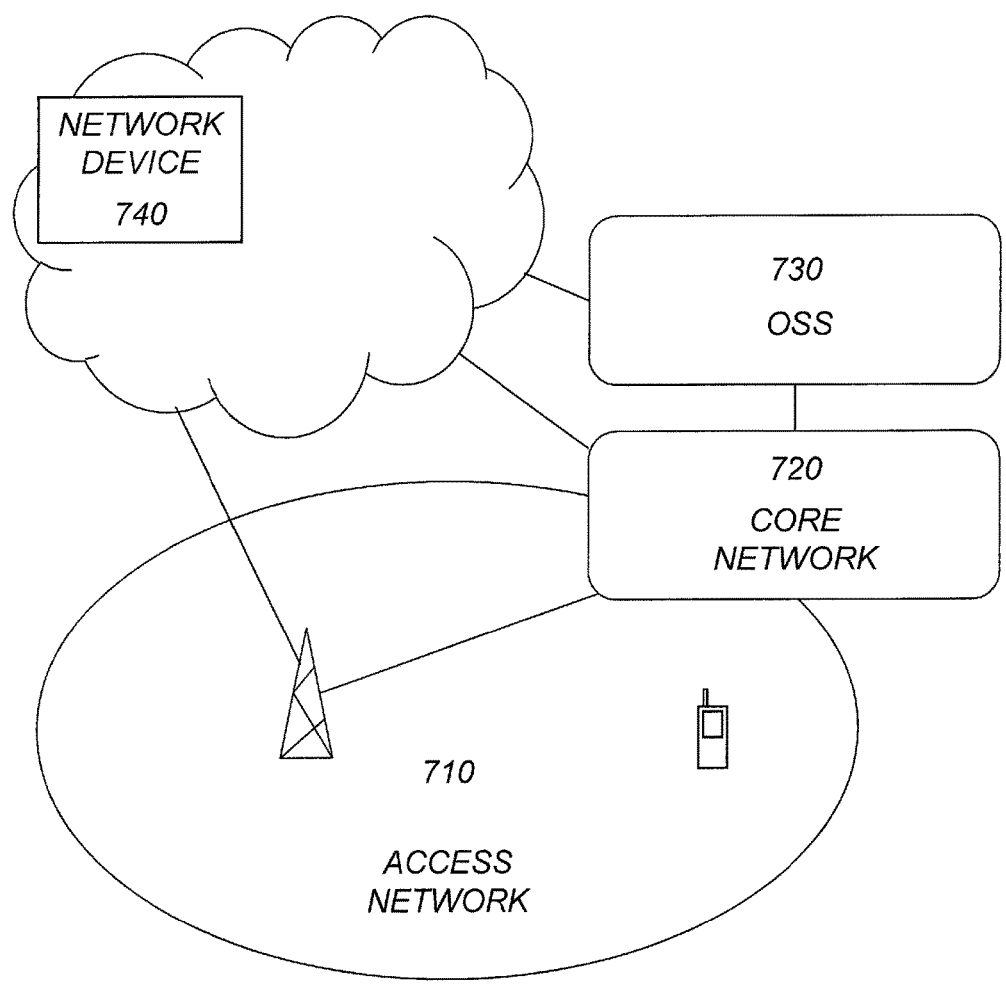
FIG. 13 is a schematic diagram illustrating an example of a wireless communication system.

FIG. 13 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for selecting wireless communication devices for measurement configuration in a wireless communication network, wherein said method implemented by an apparatus comprises steps of:
obtaining at least one report on at least one of signal strength and signal quality from a wireless communication device in said wireless communication network; and
determining whether or not to select said wireless communication device for measurement configuration, said measurement configuration comprising configuring said wireless communication device to provide measurement reports on received power from serving cells and neighbour cells in said wireless communication network, wherein said determining is based on said at least one obtained report on at least one of signal strength and signal quality, and further based on characteristics of active radio bearers for said wireless communication device, wherein said characteristics of active radio bearers comprises buffer status for said wireless communication device.

2. The method of claim 1, wherein said characteristics of active radio bearers further comprises at least one of: Quality of Service Class Identifier, QCI, for said wireless communication device, and previous traffic activity of said wireless communication device.

3. The method of claim 1, wherein said determining is further based on an inactivity timer for said wireless communication device.

4. The method of claim 1, wherein said at least one report on at least one of signal strength and signal quality comprises at least one Channel State Information, CSI, report.

5. The method of claim 4, further comprising:
filtering a plurality of consecutive Channel Quality Indicator, CQI, values for said wireless communication device to provide a filtered CQI value for said wireless communication device, said CQI values being obtained from said at least one CSI report,
wherein said determining comprises selecting said wireless communication device for measurement configuration based on determination that at least one filtered CQI value for said wireless communication device is between a pre-defined lower and upper threshold value.

6. The method of claim 1, wherein said wireless communication device is a user equipment, UE and said measurement configuration comprises configuration of Long Term Evolution, LTE, User Equipment, UE, Measurement Events.

7. An arrangement configured to select wireless communication devices for measurement configuration in a wireless communication network, the arrangement comprising:
at least one processor; and
memory containing instructions that, when executed by the at least one processer, cause the arrangement to:
obtain at least one report on at least one of signal strength and signal quality from a wireless communication device in a wireless communication network; and
determine whether or not to select said wireless communication device for measurement configuration, said measurement configuration comprising configuring said wireless communication device to provide measurement reports on received power from serving cells and neighbour cells in said wireless communication network, wherein said determine operation is based on said at least one obtained report on at least one of signal strength and signal quality, and further based on characteristics of active radio bearers for said wireless communication device, wherein said characteristics of active radio bearers comprises buffer status for said wireless communication device.

8. The arrangement of claim 7, wherein said characteristics of active radio bearers further comprises at least one of: Quality of Service Class Identifier, QCI, for said wireless communication device, and previous traffic activity of said wireless communication device.

9. The arrangement of claim 7, wherein the instructions further cause the arrangement to determine whether or not to select said wireless communication device for measurement configuration based on an inactivity timer for said wireless communication device.

10. The arrangement of claim 7, wherein said at least one report on at least one of signal strength and signal quality comprises at least one Channel State Information, CSI, report.

11. The arrangement of claim 10, wherein the instructions further cause the arrangement to
filter a plurality of consecutive Channel Quality Indicator, CQI, values for said wireless communication device over time to provide a filtered CQI value for said wireless communication device, said CQI values being obtained from said at least one CSI report,
select said wireless communication device for measurement configuration based on determination that at least one filtered CQI value for said wireless communication device is between a pre-defined lower and upper threshold value.

12. The arrangement of claim 7, wherein said measurement configuration comprises configuration of Long Term Evolution, LTE, User Equipment, UE, Measurement Events.

13. A network device configured to select wireless communication devices for measurement configuration in a wireless communication network, the network device comprising:
at least one processor; and
memory containing instructions that, when executed by the at least one processer, cause the arrangement to:
obtain at least one report on at least one of signal strength and signal quality from a wireless communication device in a wireless communication network; and
determine whether or not to select said wireless communication device for measurement configuration, said measurement configuration comprising configuring said wireless communication device to provide measurement reports on received power from serving cells and neighbour cells in said wireless communication network, wherein said determining is based on said at least one obtained report on at least one of signal strength and signal quality, and further based on characteristics of active radio bearers for said wireless communication device, wherein said characteristics of active radio bearers comprises buffer status for said wireless communication device.

14. The network device of claim 13, wherein said network device is a wireless network node.

15. An apparatus for selecting wireless communication devices for measurement configuration in a wireless communication network, wherein the apparatus comprises:
an obtaining module for obtaining at least one report on at least one of signal strength and signal quality from a wireless communication device in said wireless communication network; and a determining module for determining whether or not to select said wireless communication device for measurement configuration, said measurement configuration comprising configuring said wireless communication device to provide measurement reports on received power from serving cells and neighbour cells in said wireless communication network, wherein said determining is based on said at least one obtained report on at least one of signal strength and signal quality, and further based on characteristics of active radio bearers for said wireless communication device, wherein said characteristics of active radio bearers comprises buffer status for said wireless communication device.

16. A non-transitory computer-readable medium containing instructions, which when executed by at least one processor, cause the at least one processor to:
obtain at least one report on at least one of signal strength and signal quality from a wireless communication device in said wireless communication network; and
determine whether or not to select said wireless communication device for measurement configuration, said measurement configuration comprising configuring said wireless communication device to provide measurement reports on received power from serving cells and neighbour cells in said wireless communication network, wherein said determining is based on said at least one obtained report on at least one of signal strength and signal quality, and further based on characteristics of active radio bearers for said wireless communication device, wherein said characteristics of active radio bearers comprises buffer status for said wireless communication device.

* * * * *

UNITED STATES PATENT AND TRADEMARK OFFICE
CERTIFICATE OF CORRECTION

PATENT NO. : 9,986,453 B2  
APPLICATION NO. : 14/782079  
DATED : May 29, 2018  
INVENTOR(S) : Persson et al.

Page 1 of 1

It is certified that error appears in the above-identified patent and that said Letters Patent is hereby corrected as shown below:

In the Specification

In Column 14, Line 35, delete "(NFV))." and insert -- (NFV). --, therefor.

Signed and Sealed this  
Second Day of October, 2018

Andrei Iancu  
*Director of the United States Patent and Trademark Office*